(12) United States Patent
Kelly

(10) Patent No.: US 9,454,916 B2
(45) Date of Patent: Sep. 27, 2016

(54) DEVICE FOR EARLY TEACHING OF MATHEMATICS

(71) Applicant: Andrew David Kelly, Bristow, VA (US)

(72) Inventor: Andrew David Kelly, Bristow, VA (US)

(*) Notice: Subject to any disclaimer, the term of this patent is extended or adjusted under 35 U.S.C. 154(b) by 451 days.

(21) Appl. No.: 13/888,360

(22) Filed: May 6, 2013

(65) Prior Publication Data

US 2014/0329209 A1    Nov. 6, 2014

(51) Int. Cl.
| | | |
|---|---|---|
| *G09B 23/02* | (2006.01) | |
| *G09B 19/02* | (2006.01) | |
| *G09B 1/30* | (2006.01) | |
| *G09B 1/36* | (2006.01) | |

(52) U.S. Cl.
CPC ............... *G09B 23/02* (2013.01); *G09B 1/30* (2013.01); *G09B 1/36* (2013.01); *G09B 19/02* (2013.01)

(58) Field of Classification Search
USPC .......................................................... 434/188
See application file for complete search history.

(56) References Cited

U.S. PATENT DOCUMENTS

| | | | | |
|---|---|---|---|---|
| D163,085 S | * | 5/1951 | Bishop | D21/479 |
| 4,914,019 A | * | 4/1990 | Chu | G09B 1/36 434/171 |
| 5,040,987 A | * | 8/1991 | Frazier | 434/188 |
| 5,238,408 A | * | 8/1993 | Pollock | 434/208 |
| 6,206,701 B1 | * | 3/2001 | Kohlberg | 434/195 |
| 6,234,826 B1 | * | 5/2001 | Wilber et al. | 439/352 |
| 6,648,715 B2 | * | 11/2003 | Wiens et al. | 446/121 |
| 6,716,033 B1 | * | 4/2004 | Lassowsky | 434/205 |
| 7,354,272 B1 | * | 4/2008 | Zev | 434/188 |

* cited by examiner

*Primary Examiner* — James Hull

(57) ABSTRACT

A device for visual and tactile learning in mathematics. A set is comprised of twenty-two individual clear, square counters; eleven male (11) and eleven female (12), each set numbered respectively zero through ten. Raised numbers, and dots provide a learning platform for number recognition and counting. Raised addition and equals symbols provide a platform for learning addition and subtraction. Addition can be achieved by drawing the two counters together in a locking process. Subtraction can be achieved by stacking and locking the female counter (12) over the male counter (11).

14 Claims, 8 Drawing Sheets

DEVICE FOR EARLY TEACHING OF MATHEMATICS

This application claims priority from pending provisional application Ser. No. 01/665,554 filed on May 6, 2012, the disclosure of which is incorporated by reference herein its entirety.

BACKGROUND

As many parents are discovering, the early exposure in core subjects such as reading, writing, and mathematics are critical in the development of a child. Math particularly is a subject often ignored during these early years. In later years this can manifest as a fear of numbers, and subsequently a dislike of math. If however the discovery of numbers is encouraged in a fun, game-like way children will embrace the rudiments of math giving them a strong, life-long enjoyment for the subject.

From an early age children have the ability to recognize numbers. But what is harder to grasp for a child is what value these numbers represent. For example, a three-year-old may be able to recognize the number five, but cannot understand what it symbolizes.

The use of manipulatives (concrete learning), such as beads, and coins is very common in the early teaching of mathematics; however the transition between concrete and abstract learning where a child has to break from manipulatives and switch over to written numbers can often present difficulties.

SUMMARY

In the first stage of this invention children will learn not only to recognize the numbers zero through to ten, but they will also learn the values they hold. By counting the dots then matching the number of dots with the numeral the child will discover its true value.

Using recessed or raised dots, the children can place their fingers over the dots as they count to get a feeling of tactile awareness.

In the second stage of the invention, an introduction to addition is brought in. By the physical act of joining two counters together using a 'plus' addition symbol children will learn the rudiments of an addition sum. Early use will encourage counting the combined number of dots on both counters to give a total figure.

With repetition children will use the numerals and remember values without the need to count. The inclusion of an equals symbol on the second counter bridges the gap between abstract and concrete learning In the third stage there is an introduction to subtraction. Subtraction is a harder concept to grasp as it involves the removal of units from a given figure.

In this invention the learning child will discover the physical action of blocking out colored dots to figure out the process of subtraction.

In the same process of blocking the colored dots, the equals symbol blocks out the upper and lower tabs of the 'plus' symbol to display it as a subtraction symbol.

The inclusion of multiplication, division and 'equals' counter tablets is to expand the application in conjunction with the child's knowledge of mathematics.

DESCRIPTION

Figure 1:
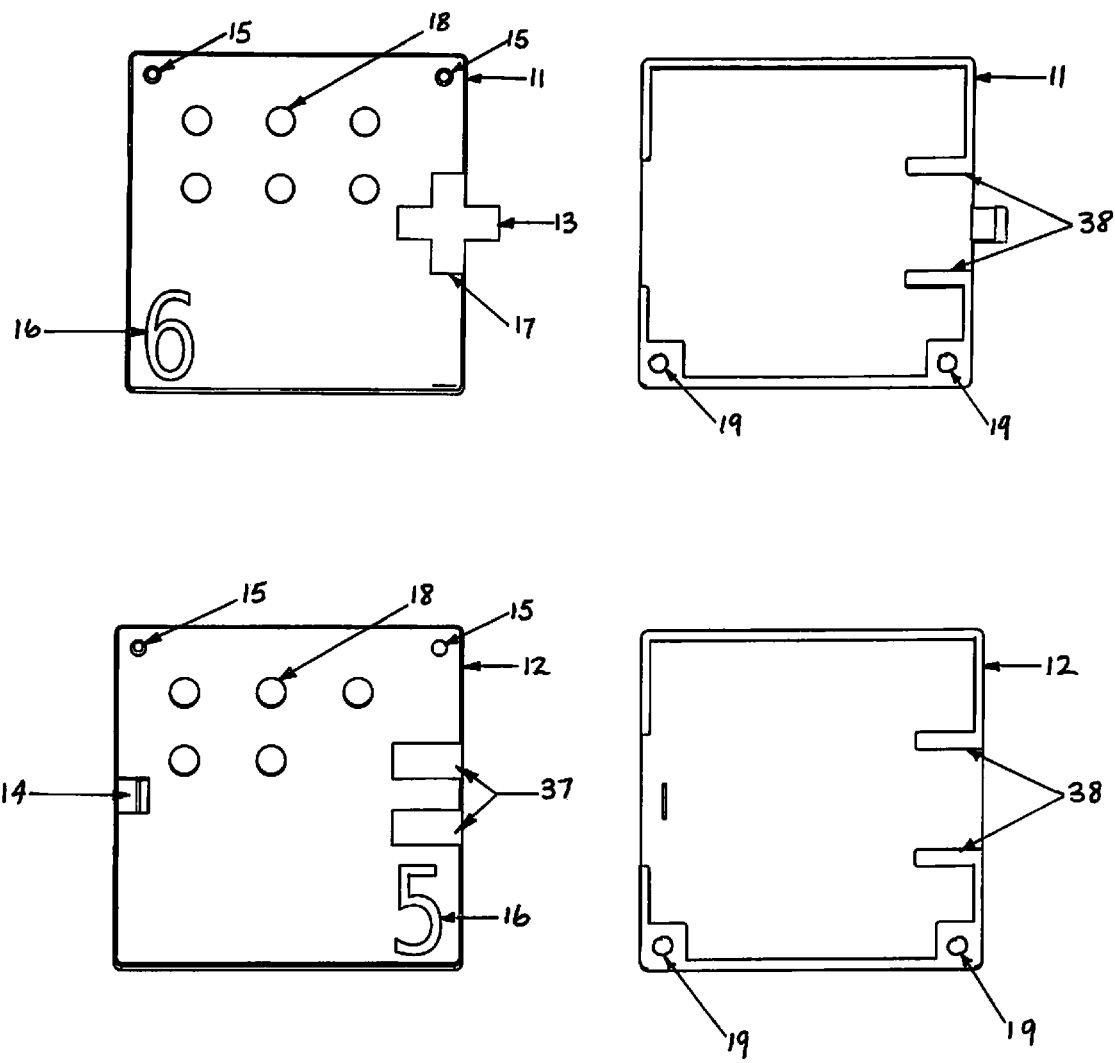
FIG. 1 is an aerial perspective of the and lower surfaces of male and female counters separated.

FIG. 1 is an aerial perspective of the male and female counter tablets constructed in accordance with the invention.

The male counter (11) is a planar tablet constructed with a square tab (13), which forms the right hand side of a 'plus' mathematic symbol (17). The female counter (12) is a planar tablet constructed with a cutout (14) configured to receive the square tab (13) when both counters are drawn together in contiguity.

It is noted that the square tab (13) and the cutout (14) is not considered to be a restriction and could be constructed to include any geometrical shaped, mechanical, or magnetic joining method.

Both the male counter (11) and the female counter (12) are transparent and include one or more dots (18) and a numeric symbol (16) corresponding to the number of dots present. The dots (18) can be formed as recesses or raised surfaces in the counters to increase tactile awareness to a user.

Locking bars (38) form part of the lower sections of male counter (11) and female counter (12), which continue around the perimeter of the counter, acting as counter rigidity.

These locking bars (38) act as a locking medium when two counters are joined in stacking contiguity. This acts for the purpose of mathematical subtraction, and general stacking purposes.

The locking bars (38) fit on either side of the upper and lower surfaces of math plus symbol (17) when stacked in subtraction manipulation. The locking bars (38) also fit on either side of the upper and lower horizontals of the parallel bars which form equals symbol (37) on female counter (12) for general stacking purposes. (see also FIG. 5. for isometric perspective)

It is noted that the locking bars (38) are not a restriction in aligning the counters in stacking contiguity and any geometric shape could be used.

Equally it is noted that mechanical stacking means for counter alignment are not considered to be a restriction and magnetic locking means could also be considered.

Two raised, domed location pegs (15) on the upper top corners of both male counter (11) and female counter (12) locate in matching recessed domed location point (19) on the lower surfaces of counters. The domed location pegs (15) are in addition to the locking bars (38) for stacking in contiguity.

Figure 5:
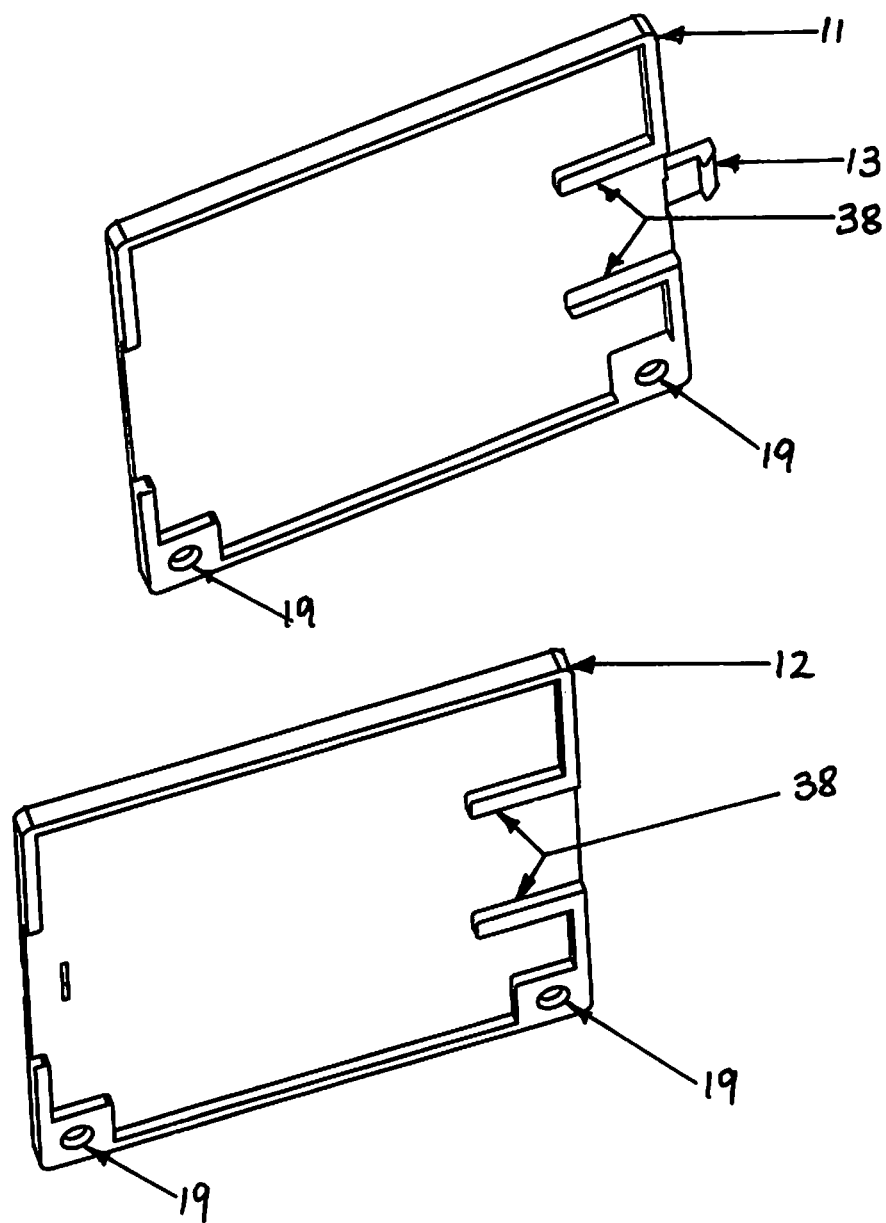
FIG. 5 is an isometric perspective of the lower surfaces of the male and female counters.

(see also FIG. 5. for isometric perspective)

It is noted that the domed location pegs (15) are not a restriction and any shaped geometrical design, could form an additional locating medium.

It is noted also that the position of the domed location pegs (15) in the top corners is not a restriction and could also be placed in other locations of the male counter (11) and female counter (12).

Two opaque parallel bars (37) on the upper surface, aft edge of counter (12), opposite the cutout (14) form a mathematical equals sign. The opaque parallel bars (37) represent the 'equals' mathematical symbol for use in the addition manipulation. (see also FIG. 3.)

The opaque parallel bars (37) are arranged so as to block out the upper and lower portions of the 'plus' mathematics symbol (17) on the male counter (11) when the female counter (12) is placed thereon during a subtraction manipulation. By effectively blocking out the portions of the 'plus' mathematical symbol (17), the opaque parallel bars (37) effectively create a 'minus' symbol that can be recognized by a user. (see also FIG. 4.)

Opaque parallel bars (37) can be formed by placing a color or coating on the surface of the counter, or by simply roughing up a portion of the surface.

The desired material of construction is transparent injection molded plastic. Equally it could be constructed from other clear plastics, glass or ceramic material.

The shape of each counter is square, but equally it could be constructed in any other geometric shape.

The math 'plus' symbol (17) is a color, for example red. This should not be considered a restriction and could be represented in any other color.

It is noted that the square tab (13) could also form a portion of another mathematical symbol such as a multiplication or division symbol that forms multiplication and division calculations as discussed below.

Figure 2:
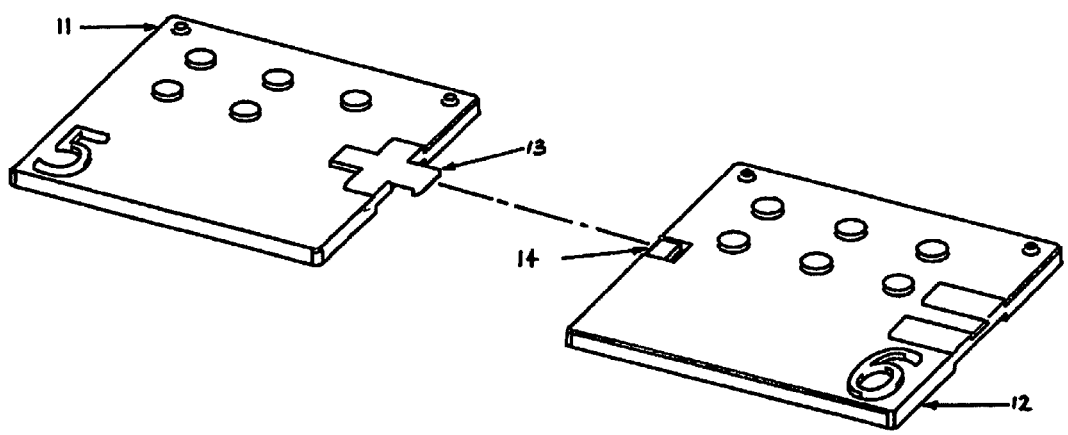
FIG. 2 is an isometric perspective showing how the male and female counters connect together.

FIG. 2 is an isometric perspective of male counter (11) and female counter (12) separated showing the square tab (13), which forms part of the 'plus' math symbol (17).

Also shown is the cutout (14) which receives the square tab (13) when the male counter (11) and the female counter (12) are joined in contiguity.

Figure 3:
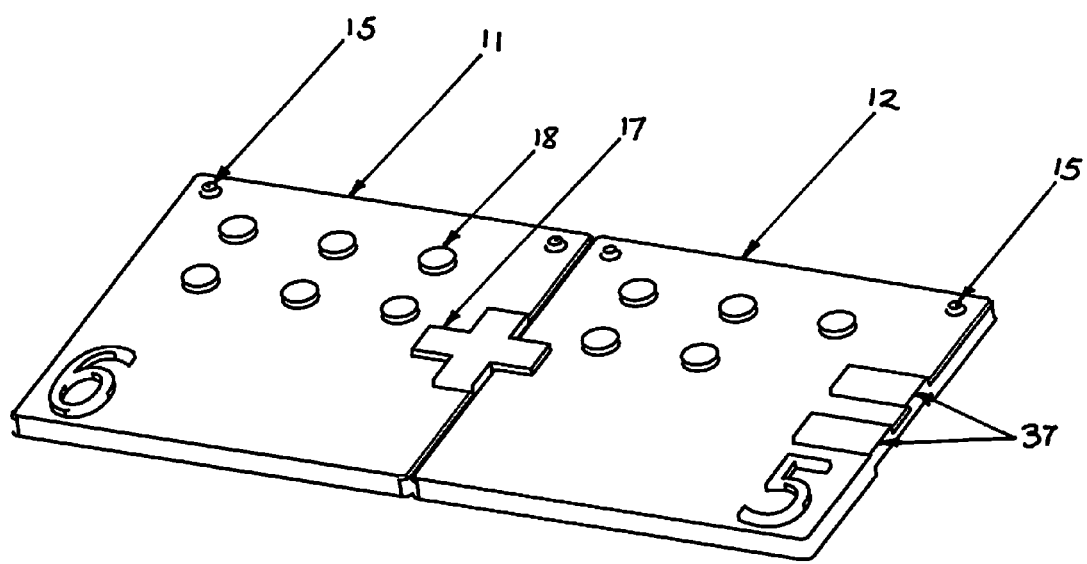
FIG. 3 is an isometric perspective showing how the male and female counters joined together in addition.

FIG. 3 is an isometric view of male counter (11) and female counter (12) connected together in contiguity to form an addition 'sum.'

Figure 4:
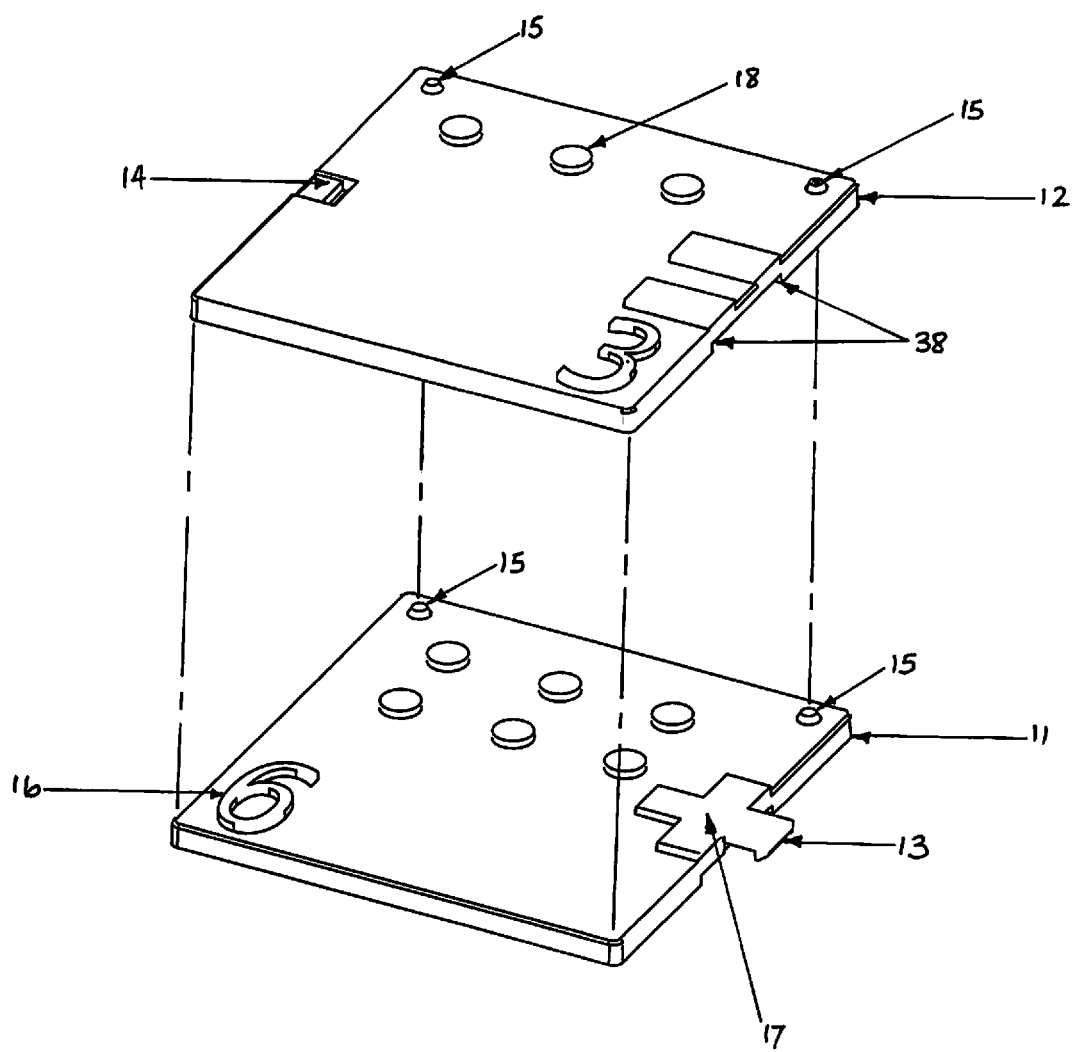
FIG. 4 is an isometric perspective showing how the female counter locates over the male counter in subtraction.

FIG. 4 is an isometric perspective displaying how the female counter (12) locates in stacking contiguity with the male counter (11). Two raised domed location pegs (15) on the top corners of the male counter (11) are designed to locate into matching recessed domed location points (19) on the female counter (12).

In addition the edges of location bars (38) are shown when female counter (12) is stacked over male counter (11) for location over upper and lower portions of the 'plus' mathematics symbol (17) in subtraction manipulation.

FIG. 5 is an isometric perspective displaying the underside of male counter (11) and female counter (12). Displayed on male counter (11) is the square tab (13). Displayed on both counters (11) and (12) are locking bars (38), and recessed domed location point (19) which form the stacking and locking method as described in FIG. 1. and FIG. 4.

Figure 6:
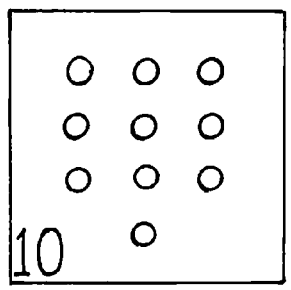
FIG. 6 is an aerial perspective of one generic group of counters showing the layout of dots and numbers.
Figure 6:
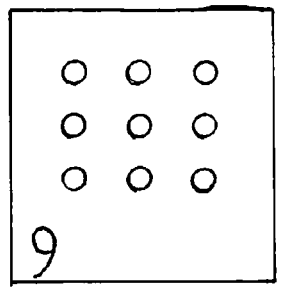
Figure 6:
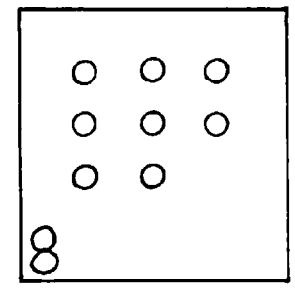
Figure 6:
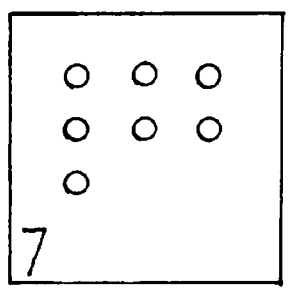
Figure 6:
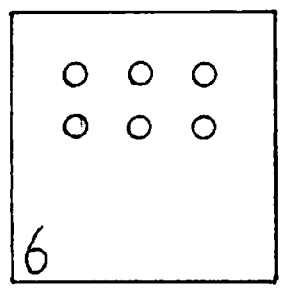
Figure 6:
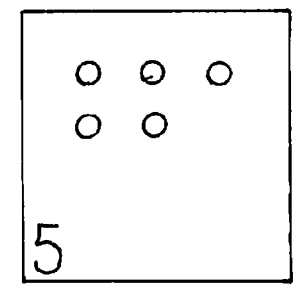
Figure 6:
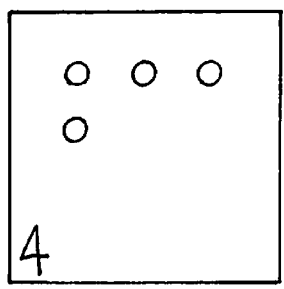
Figure 6:
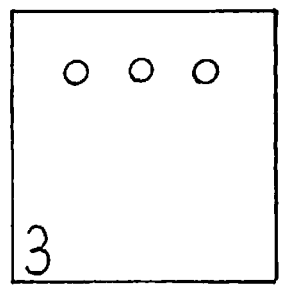
Figure 6:
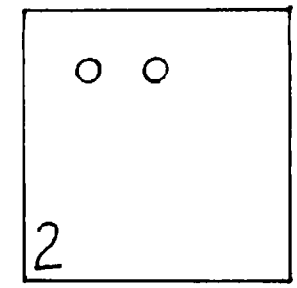
Figure 6:
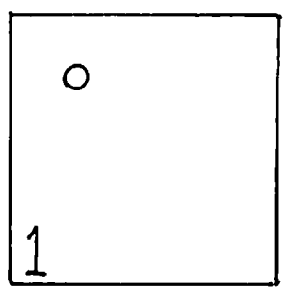
Figure 6:
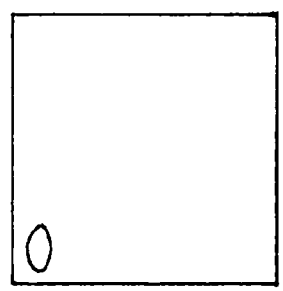

FIG. 6 is an aerial perspective of the layout representing the layout of each individual counter; respectively showing the plurality of figures zero through ten.

This perspective omits the square tab (13) and cutout (14) to show a generic view of the layout on both sets of counter tablets.

The counters are shown to include a maximum of ten dots. This number should not be considered a restriction, as any number of dots could be used.

Also, the dots are shown in rows of three. Neither should this be considered a restriction as any pattern of dots could be placed to represent a desired number.

The dots (18) are numbered to represent the numerical symbol (16) indicated on the counter.

Example: Ten dots represents, the number ten.

For the male counter (11) the dots and numbers are colored, for example red.

For the female counter (12) the dots and numbers are colored for example blue.

The dot color in this design is red and blue; it should be noted they could be colored differently and should not be restricted solely to those colors.

Equally where it is preferable to construct the counters using round dots, the design should not be restricted to those shapes. Any geometric shape could be used.

The layout and spacing of the dots are identical on both sets of counters. The design is as such when one female counter (12) is placed symmetrically over the other male counter (11), the dots will align exactly.

Figure 7:
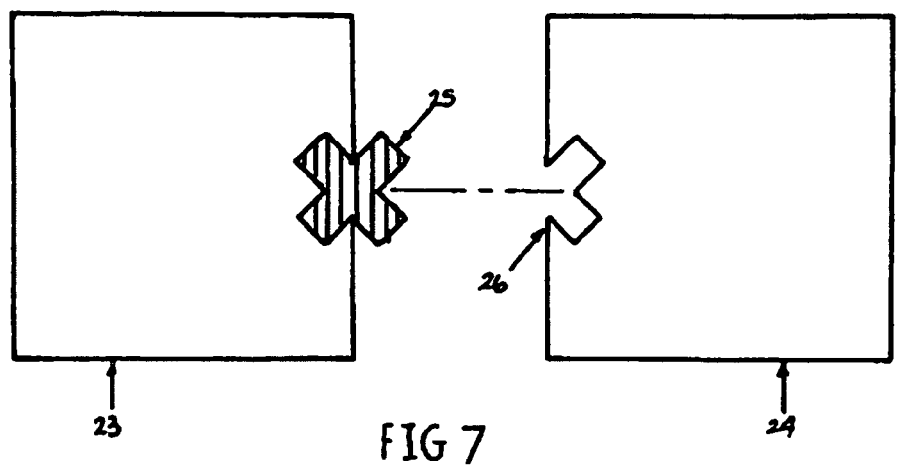
FIG. 7 is an aerial perspective of a pair of counter tablets with a multiplication symbol.

FIG. 7 is an aerial perspective of the layout of a counter (23) with the multiplication tab (25) in the form of a multiplication symbol. Counter (24) in this case has a multiplication cutout (26) in the same shape as the multiplication tab (25) when both counter tablets are joined together in contiguity. This joining method should not be considered a restriction and any other locking method using different styles of tooth and tab could be used. Equally mechanical locking methods should not be considered a restriction and magnetic locking methods could also be used.

The multiplication symbol is colored, for example red. However this is not a restriction and could be any given color. It is noted that in such an embodiment the layout of the dots may be different than previously set forth for the addition and subtraction counters.

Figure 8:
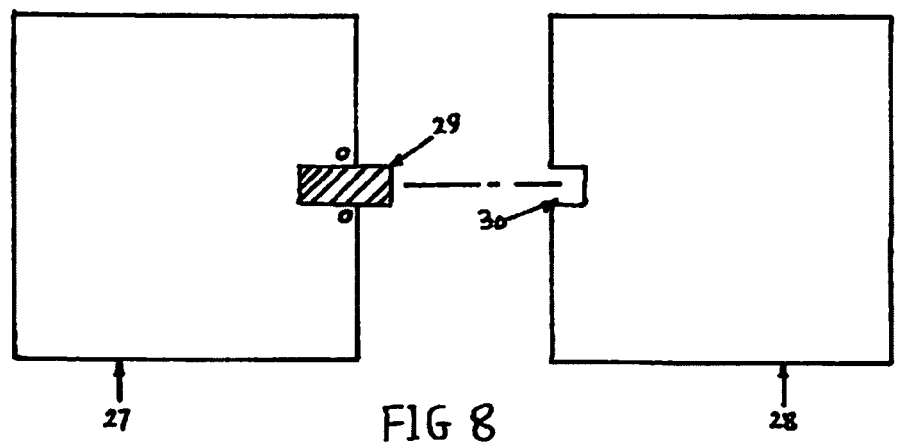
FIG. 8 is an aerial perspective of a pair of counter tablets with a division symbol.

FIG. 8 is an aerial perspective of the layout of a counter (27) with division tab (29) in the form of a of a division symbol. Counter (28) has the same sized division cutout (30) designed to receive the division tab (29) when joined together in contiguity.

This joining method should not be considered a restriction and any other locking method using different styles of tooth and tab could be used. Equally mechanical locking methods should not be considered a restriction and magnetic locking methods could also be used.

The division symbol is colored, for example red. However this is not a restriction and could be any given color. It is noted that in such an embodiment the layout of the dots may be different than previously set forth for the addition and subtraction counters.

Figure 9:
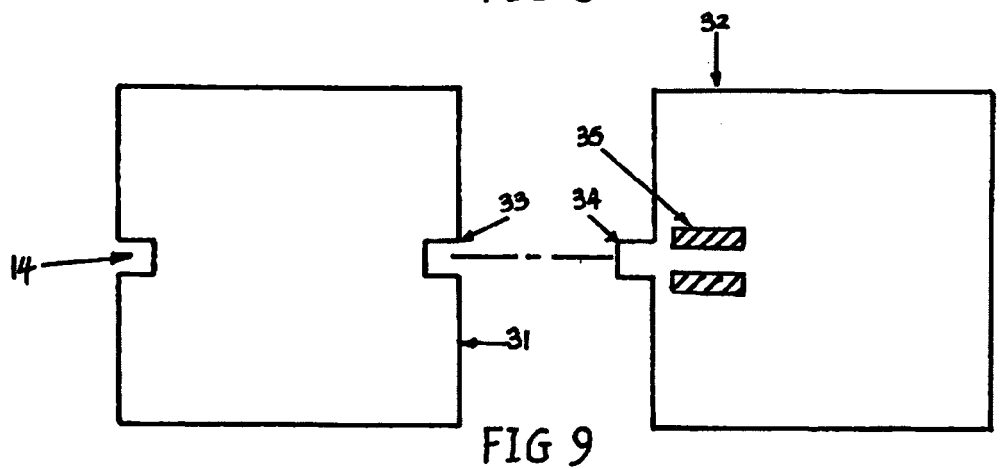
FIG. 9 is an aerial perspective of a pair of counter tablets, the second tablet containing an equals sign, when drawn together form the resultant of a mathematical equation.

FIG. 9 is an aerial perspective of the layout of a planar counter (31) with a cutout (33) designed to receive tab (34) of counter (32). Tab (34) is the same size as cutout (33) designed to join both counter (31) and equals counter (32) in contiguity.

Cutout (14) is configured to receive square tab (13) from male counter (11) for connection in contiguity.

This joining method should not be considered a restriction and any other locking method using different styles of tooth and tab could be used. Equally mechanical locking methods should not be considered a restriction and magnetic locking methods could also be used.

The mathematical equals symbol (35) is colored, for example red. However this is not a restriction and could be any given color.

Figure 10:
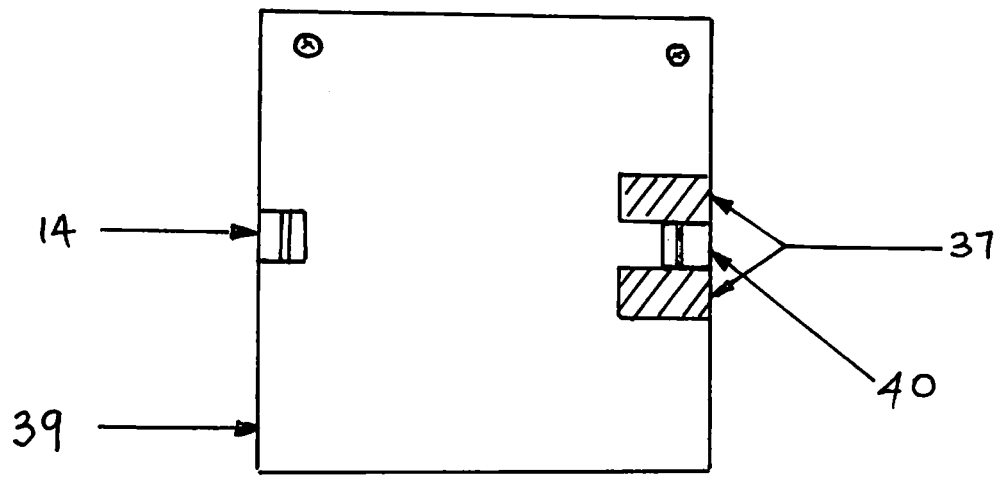
FIG. 10 is an aerial perspective of a female counter tablet with two shaded portions forming an equals sign.

In FIG. 10, a female counter (36) is shown having a cutout (14) and a pair of opaque parallel bars (37) opposite the cut out (14). Opaque parallel bars (37) are arranged so as to block out the upper and lower portions of the 'plus' mathematic symbol (17) on the male counter (11) when the female counter (36) is placed thereon during a subtraction manipulation. By blocking out the portions of the 'plus' mathematic symbol (17), the opaque parallel bars (37) effectively create a 'minus' symbol that can be recognized by a user. The opaque parallel bars (37) also represent the 'equals' mathematic symbol for use in the addition manipulation. Opaque parallel bars (37) can be formed by placing a color or coating on the surface of the counter, or simply roughing up a portion of the surface.

An additional cutout (40) is configured between the opaque parallel bars (37). The cutout (40) is configured to receive male tabs of additional planar counters in contiguity.

Figure 11:
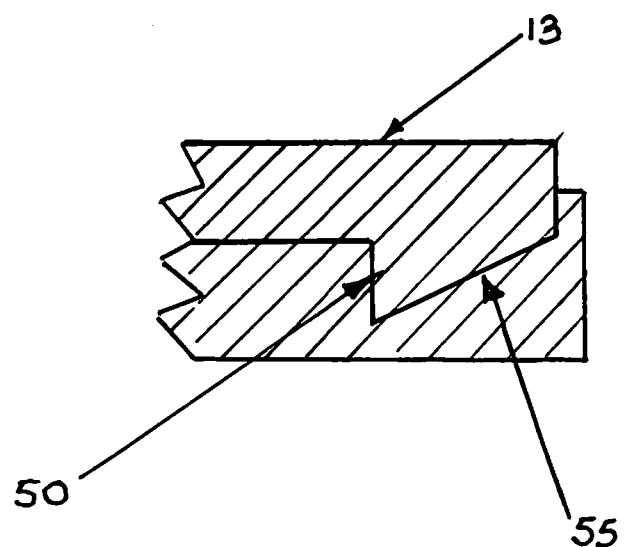
FIG. 11 is a cross-sectional perspective of the male and female counter locking mechanism.

FIG. 11 is a cross-sectional perspective of square tab (13) as it locates in cutout (14). Shown is ramped tooth (50) as it locks into ramped receptacle (55).

Operation (1) Learning to Count and Number Recognition

In operation the counters can be used first to teach number recognition.

The number (16) on each counter represents the number of dots (18). By covering the number on the counter, the child learns to count the dots and repeats what the hidden number should be.

(2) Learning Addition

By attaching male counter (11) to female counter (12) an addition sum is made.

The square tab (13) will lock into cutout (14). Horizontal movement is prohibited when ramped tooth (50) is located into ramped receptacle (55).

It is a physical action of bringing two numbers together in 'addition'.

The child will use the number on the male counter (11) and continue counting onto the female counter (12) to discover the total number of dots (18). This number is the 'addition sum.' An observation of the mathematical symbols (plus and equals) will emphasize the process in addition to reinforce the abstract concept of addition.

(3) Learning Subtraction

By placing a female counter (12) over a male counter (11) the domed location pegs (15) locate into the recessed domed location points (19) of the female counter.

The location bars (38) will stack over the upper and lower portions of the 'plus' math symbol (17) on the male counter (11) preventing any torsional movement of the two counters.

Both these alignment mediums act to keep both the counters and all respective dots stacked together in their lateral and longitudinal planes.

Example: Ten minus six.

The blue numbered female counter (12) with six blue dots is placed over a red numbered male counter (11) with ten red dots.

As the dots (18) align and cover each other, it can be seen that six of the red dots are masked out. This leaves a remaining four red dots.

These remaining four dots are the 'sum of ten minus six', which equals four.

10−6=4

The design of the numbers on each counters are that the red number on the male counter (11) shows through the transparency left of the blue female counter (12) number.

This aids in the teaching of how numbers are set in the order of a subtraction sum.

To further emphasize the subtraction sum, the opaque parallel bars (37) on the female counter (12) when stacked over the male counter (11) will block out the upper and lower portions of the 'plus' symbol (17). The user will be able to visualize the middle section of the plus symbol as a math 'minus' symbol.

For storage and stacking purposes the locking bars on both male counters (11) and female counters (12) will stack on each other. The locking bars (38) and raised domed pegs (15) on the male counter (11) when placed over the female counter (12), will lock over the top and bottom of the opaque parallel bars (37)

REFERENCE NUMERALS

11. Male counter.
12. Female counter.
13. Square Tab
14. Cutout.
15. Domed location pegs
16. Number.
17. Math addition symbol.
18. Dot.
19. Recessed domed location point.
23. Male multiplication counter.
24. Female multiplication counter.
25. Multiplication tab.
26. Multiplication cutout.
27. Male division counter.
28. Female division counter.
29. Division tab.
30. Division Cutout.
31. Counter.
32. Equals Counter.
33. Cutout.
34. Tab.
35. Equals Symbol.
36. Counter.
37. Opaque parallel bars
38. Locking bars.
39. Counter tablet.
40. Cutout.
50. Ramped tooth.
55. Ramped receptacle.

I claim:

1. An apparatus for teaching mathematics comprising: a first and second tablet; and means of joining the first and second tablets together, wherein the first tablet includes a ramped-tooth tab, wherein the tab forms part of a raised addition plus mathematical symbol, and wherein the second tablet includes a raised equals symbol, wherein a lower section of the first and second tablets include at least one locking bar configured to releasably engage an opposing upper and lower surface of the raised addition plus mathematical symbol or the raised equals symbol when the first and second tablets are stacked.

2. The apparatus in claim 1, wherein said first and second tablets are clear.

3. The apparatus in claim 1, wherein said first and second tablets are square.

4. The apparatus in claim 1, wherein said first and second tablets are identical in size.

5. The apparatus in claim 1, wherein at least one of the first or second tablets includes at least one dot.

6. The apparatus of claim 5, wherein the at least one dot is raised or recessed.

7. The apparatus in claim 5, wherein the at least one tablet including the at least one dot includes a number that corresponds to the number of dots.

8. The apparatus in claim 1, further comprising a numeric symbol.

9. The apparatus in claim 8, wherein the numeric symbol corresponds to a number of raised dots positioned on a surface of the first or second tablet.

10. The apparatus in claim 8, wherein the tab locates in a ramped recess.

11. The apparatus in claim 1, wherein at least one of the tablets has at least one domed location peg.

12. The apparatus in claim 1, wherein a lower section of the first and second tablets include at least one additional locking bar.

13. The apparatus in claim 12, wherein the raised equals symbol is opaque so as to block out a portion of the raised addition plus mathematical symbol when the second tablet is stacked on the first tablet to create a minus symbol.

14. The apparatus in claim 1, wherein the first and second tablets include at least one dot, and are capable of being stacked in order to align the dots.

* * * * *